United States Patent [19]

McGovern

[11] 4,126,013
[45] Nov. 21, 1978

[54] PIPELAYING UNDER ICE BY BOTTOM PULL

[75] Inventor: Roger McGovern, Hudson, Canada

[73] Assignee: Montreal Engineering Company, Limited, Montreal, Canada

[21] Appl. No.: 831,396

[22] Filed: Sep. 8, 1977

[51] Int. Cl.² ............................................. F16L 1/00
[52] U.S. Cl. .................................... 405/169; 405/217
[58] Field of Search .............................. 61/105–114, 61/72.7, 1 R; 165/45

[56] References Cited

U.S. PATENT DOCUMENTS

| 996,866 | 7/1911 | Lilly | 61/72.7 |
|---|---|---|---|
| 3,559,413 | 2/1971 | Silverman | 61/108 |
| 3,600,898 | 8/1971 | Godfrey | 61/107 |
| 3,605,420 | 9/1971 | Booth et al. | 61/72.7 |
| 3,681,927 | 8/1972 | Duc et al. | 61/1 R |
| 3,950,955 | 4/1976 | Meeres | 61/107 |
| 4,055,052 | 10/1977 | Metge | 61/1 R X |

Primary Examiner—Dennis L. Taylor

[57] ABSTRACT

A method of laying an underwater pipeline underneath an ice sheet by a bottom pull which includes making up a pipe string, on a first shore of a water crossing, providing a first cable connection along the upper surface of the ice sheet between a pulling location and an on-ice pull sled, attaching a second cable between the pull sled and the leading end of the pipe string, cutting a slot through the ice along the path which the pipe is to take, ahead of the pull sled, and pulling the pull sled over the upper ice surface so as to tow the pipe string along the water bottom by means of the second cable which is submerged through the slot.

6 Claims, 7 Drawing Figures

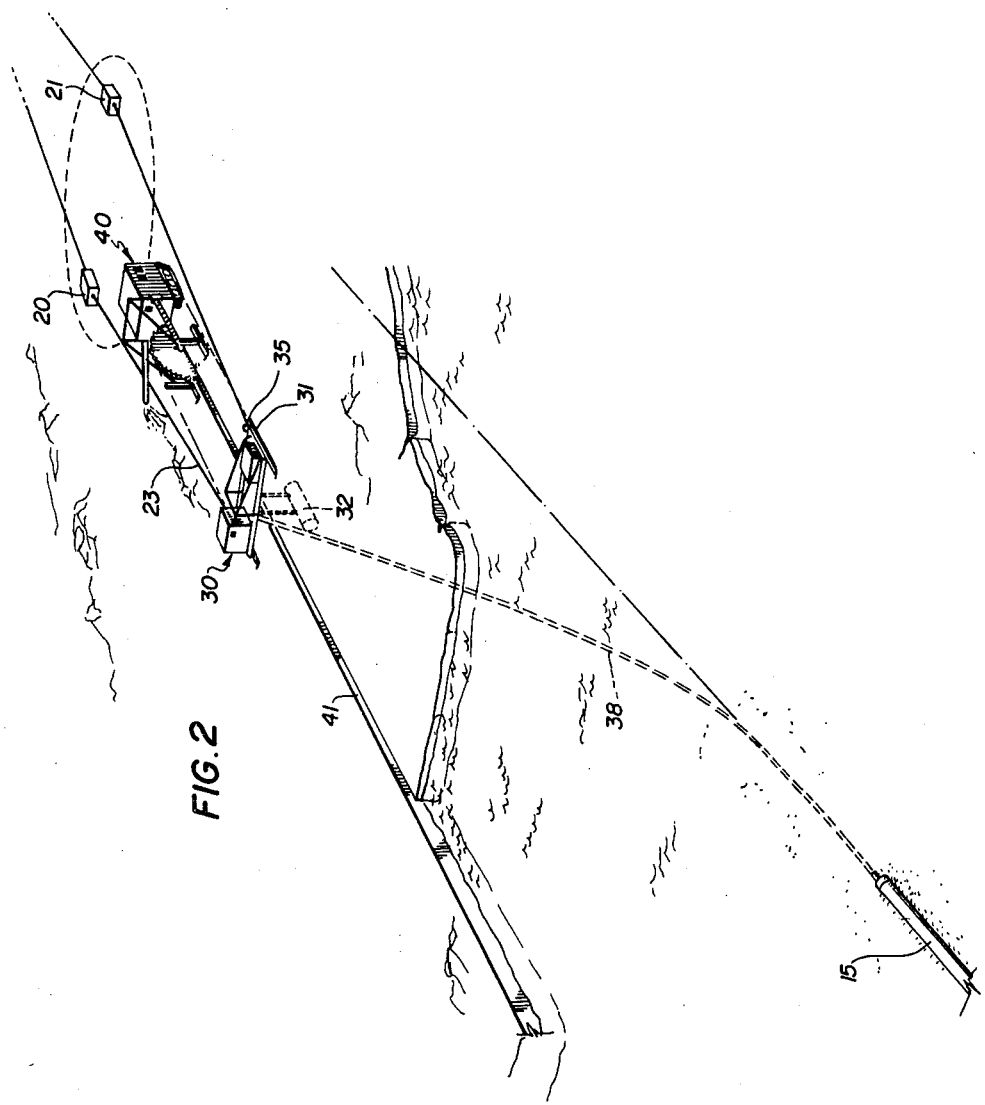

PIPELAYING UNDER ICE BY BOTTOM PULL

BACKGROUND OF THE INVENTION

The present invention is concerned with pipelaying methods and particularly with underwater pipelaying where the water is covered by an ice sheet.

It has previously been proposed to fabricate a pipe string, lay it on the top surface of the ice sheet, cut a slot in the ice sheet adjacent the pipe string, and to provide a series of gantry-like pipe lowering devices which span the trench and carry an underwater guideway down which the pipe is lowered through the slot in the ice to the sea bottom.

It is also known to lay underwater pipelines by a bottom pull method. In conventional bottom pull methods, pipe lengths are fabricated into a pipe string on shore and attached by a winching cable to a pulling station on a far shore or a pull barge located on the water surface; by which the string is pulled along the water bottom to the far shore. The pull cable in this instance may be supported on the water surface by floats to reduce the length of pull cable along the bottom of the channel.

The problem with the conventional bottom pull method in ice-covered water where the string length is great, is that ice cover prohibits the use of floats. The present invention seeks to provide a method by which long lengths of pipeline may be laid underwater, underneath an ice surface, by a bottom pull method.

SUMMARY OF THE INVENTION

According to the present invention, there is provided a method of laying an underwater pipeline underneath an ice sheet by a bottom pull, comprising: locating a pipe string to be laid adjacent a first shore; providing first cable means along the upper surface of the ice sheet; connecting said first cable means, on the one hand, to pulling means located at a pulling point, and on the other hand, to an ice pull sled; attaching a second cable means between said pull sled and the pipe string to be laid; cutting a slot through the ice along a projected pipelaying path ahead of said pull sled; and operating said pulling means to pull said sled over the upper ice surface along said path and tow said pipe string along the water bottom by said second cable means through said slot. Preferably the pipe length to be towed is fabricated on the shore from a series of pipe sections.

Where the distance between shores is great, the present invention also includes the step of forming at least one ice island between the first and second shores where the pipeline is to be laid, which ice island accommodates a pulling point. Where the distances are very great between the shore lines, the invention envisages that a number of ice islands may be provided, each ice island forming a pulling point, with the second shore forming a final pulling point.

To accommodate for different conditions, the pull sled is preferably adapted for variable buoyancy, having buoyancy means which depend from the sled, through the slot in the ice, into the water.

In a preferred construction according to the invention, the cable between the sled and the pipe is of fixed length.

BRIEF DESCRIPTION OF THE DRAWINGS

The following is a description by way of example of certain embodiments in accordance with the present invention, reference being had to the accompanying drawings in which:

FIG. 2 is a detail to an enlarged scale.

DETAILED DESCRIPTION OF PREFERRED EMBODIMENT

Figure 1A:
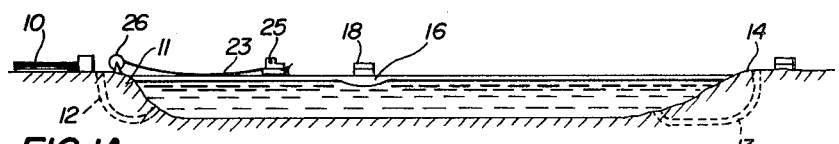
FIGS. 1A, B, C, D, E, show a method of pipelaying in which the pipe is laid on the bottom of the water with a single ice island being provided between the shores.

Referring now to the drawings, a series of pipeline lengths are fabricated into a string to be laid, at a make-up yard 10 adjacent a first shore 11. In the embodiment illustrated a shore approach tunnel 12 is provided at the first shore and a shore approach tunnel 13 is provided a second shore 14, towards which the pipeline 15 is to be laid. Conveniently, the shore approach tunnels could be constructed in accordance with the teachings of U.S. application 831,394 by John Anthony Owen entitled Tunnel. In the instance shown in FIGS. 1A–E it is assumed that the distance between the first shore 11 and the second shore 14 is such that it is necessary to construct only one ice island 16 partway between the first shore 11 and the second shore 14. On the ice island 16, a winch, or more preferably a gripper jack set, 18 is set up and the gripper jack set 18 is anchored into the ice island. The ice island is created in known manner by artificially thickening the ice to provide an island strong enough to withstand the applied forces. In FIG. 2, two such gripper jack sets are housed in housings 20 and 21.

A first cable means 23 is towed out onto the ice by some suitable means, for example, bulldozers 25 from cable spools 26 on the first shore to the gripper sets 20 and 21.

A pull sled 30 (best shown in FIG. 2) is provided with on-ice runners 31 and a variable buoyancy chamber 32. The cable means 23 is passed around sheaves 35 on the sled 30 and joined. The first cable means 23 from the gripper jacks 18 do not pull the pipe string 5 directly but run along the ice surface to the sled 30. As the surface cables 23 pull the sled 30 forward so the sled pulls the pipe forward. With this method frictional drag is reduced because the cables run along the ice rather than along the channel bed, and the cables are readily accessible and can be handled easily.

A ditching device 40 is provided for cutting a slot 41 through the ice and it commences the slot 41 adjacent the first shore 11 and proceeds along the projected pipelaying path to the ice island 16, and on to the far shore 14.

A second cable means 38 is attached between the pull sled 30 and the pipe length 15 to be laid.

The length of the submerged cable 38 is fixed so that the cable is prevented from dragging along the channel bed. This means that the end of the pipe string is lifted off-bottom to varying degrees as the pipe is pulled and length of the cable is chosen so that the pipe is never over stressed.

Obviously, the sequence of connecting the cables and the digging of the slot with the ditcher 40 can be arranged to suit the convenience of the circumstances; for example, if there is a hole in the ice adjacent the first shore, the sled 30 can be launched first and the second cable means 38 attached between it and the pipe length 15 before the cable 23 is attached to the sled 30, or the sequence can be reversed and the plowing of the slot can take place at any time preceding the actual commencement of pipelaying.

Figure 1B:
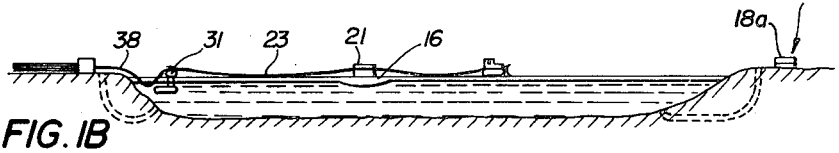
FIG. 1F shows a similar method to that shown in FIG. 1A where three ice islands are used.
Figure 1C:
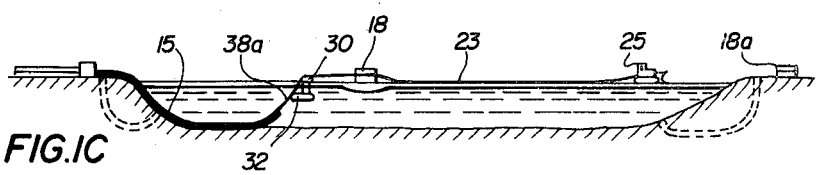
Figure 1D:
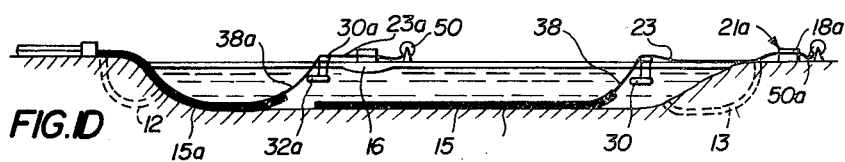
Figure 1E:
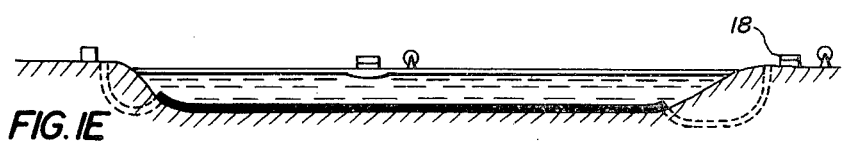

In FIG. 1B, it will be noted that the cables 23 are towed through their gripper jack set housed in housings 20 and 21 farther across the ice sheet to the opposite shore 14 where a further set of gripper jacks 18a are housed in buildings, one of which is schematically shown at 21a. While the bulldozer continues with the laying of the cable 23, the surface sled 30 leaves the shore 11 with its buoyancy chamber 32 beneath the ice surface. The prepared string of pipe 15 is pulled along the bottom, as best seen in FIG. 1C. As the sled 30 proceeds past the ice island 16, a second sled 30a attached in similar fashion by cables 23a tows a second length of pipe 15a, as best seen in FIG. 1D. Spools 50 and 50a reel in the cables 23 and 23a and the entire span of pipe comprising the lengths 15 and 15a is completed by attaching length 15 to length 15a in any suitable fashion and by attaching length 15 to approach tunnel 13, and length 15a to tunnel 12.

Figure 1F:
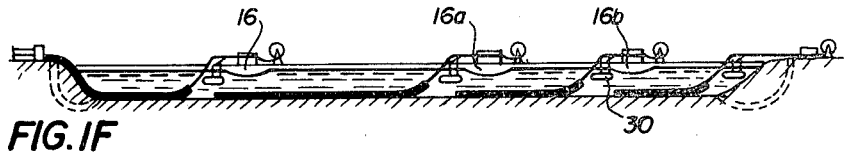

As seen in FIG. 1F where a multiple number of islands 16, 16a 16b, is required the procedure is simply repeated until the full span of pipe is in place.

When pulling the sled 3 across the ice surface and towing the pipe 15 along the bottom, there may be a tendency for the cable 38 to straighten out causing an increase in the resultant force on the sled against the ice. By increasing the buoyancy in the tank 32, this increase in resultant force is counteracted to produce an acceptable force pattern on the ice.

Although in the drawings hereof, the pipeline has been shown connected to shore approach tunnels, it is to be understood that the method of the present invention is equally applicable to other shore approach methods.

What I claim as my invention is:

1. A method of laying an underwater pipeline underneath an ice sheet by a bottom pull, comprising: locating a pipe string to be laid adjacent a first shore; providing first flexible cable means along the upper surface of the ice sheet; connecting said first cable means, on the one hand, to pulling means located at a pulling point, and on the other hand, to an ice surface pull sled; attaching a flexible underwater cable means between said pull sled and the pipe string to be laid; cutting a slot through the ice with an ice ditching means along a projected pipelaying path ahead of said pull sled; and operating said pulling means to pull said sled over the upper ice surface along said path and tow said pipe string along the water bottom by said underwater cable means through said slot.

2. A method as claimed in claim 1 in which the pipe string to be towed is made-up at said shore, from a series of pipe sections.

3. A method as claimed in claim 1 including the step of forming at least one ice island by artificially thickening the ice to accommodate a pulling point intermediate said first shore and a second shore towards which the pipeline is to be laid.

4. A method as claimed in claim 1 including the step of controlling the vertical loading at the sled by varying the buoyancy of a variable buoyancy means depending from said sled through said slot into the water.

5. A method as claimed in claim 3 in which a plurality of ice islands are formed between said shores, each ice island forming one pulling point and said second shore forming a final pulling point.

6. A method as claimed in claim 1 in which the length of the underwater cable is fixed.

* * * * *